WIEN BRIDGE OSCILLATOR

Filed April 13, 1964 2 Sheets-Sheet 1

INVENTOR.
FRANK S. GUROS
HERBERT J. SCHAD
BY
ATTORNEY.

Jan. 4, 1966 F. S. GUROS ETAL 3,227,966

WIEN BRIDGE OSCILLATOR

Filed April 13, 1964 2 Sheets-Sheet 2

INVENTOR.
FRANK S. GUROS
HERBERT J. SCHAD

BY

H. S. Markus

ATTORNEY.

3,227,966

WIEN BRIDGE OSCILLATOR

Frank S. Guros, Yorktown Heights, and Herbert J. Schad, Briarcliff, N.Y., assignors to General Precision, Inc., a corporation of Delaware Filed Apr. 13, 1964, Ser. No. 359,266
9 Claims. (Cl. 331—141)

This invention relates to oscillators of the Wien bridge type and more particularly to such an oscillator utilizing inductance and resistance in the frequency controlling arms of the bridge.

Inductance-resistance Wien bridge oscillators are particularly useful because they may be made to vary linearly with potentiometer settings over a relatively wide range. However, if it is desired to change the range or bandwidth of operation, it is necessary to physically remove the controlling potentiometers and to substitute others of different values.

The present invention overcomes this difficulty by providing an arrangement wherein different ranges of values of resistance may be reflected into the frequency controlling arms of the Wien bridge network by simple manual manipulation so that the oscillator may not only be varied over a range of frequencies but also may be selectively operated over different ranges or band of frequencies.

One purpose of the present invention therefore is to provide an oscillator which may be easily and conveniently varied over selected different bandwidths of frequencies.

Another purpose of the invention is the provision of a variable oscillator circuit in which the initial or lower frequency of the band over which the oscillator output is to be varied may be shifted at will.

The exact nature of the invention will be more readily understood from the following detail description when considered together with the attached drawings, in which.

Figure 1:
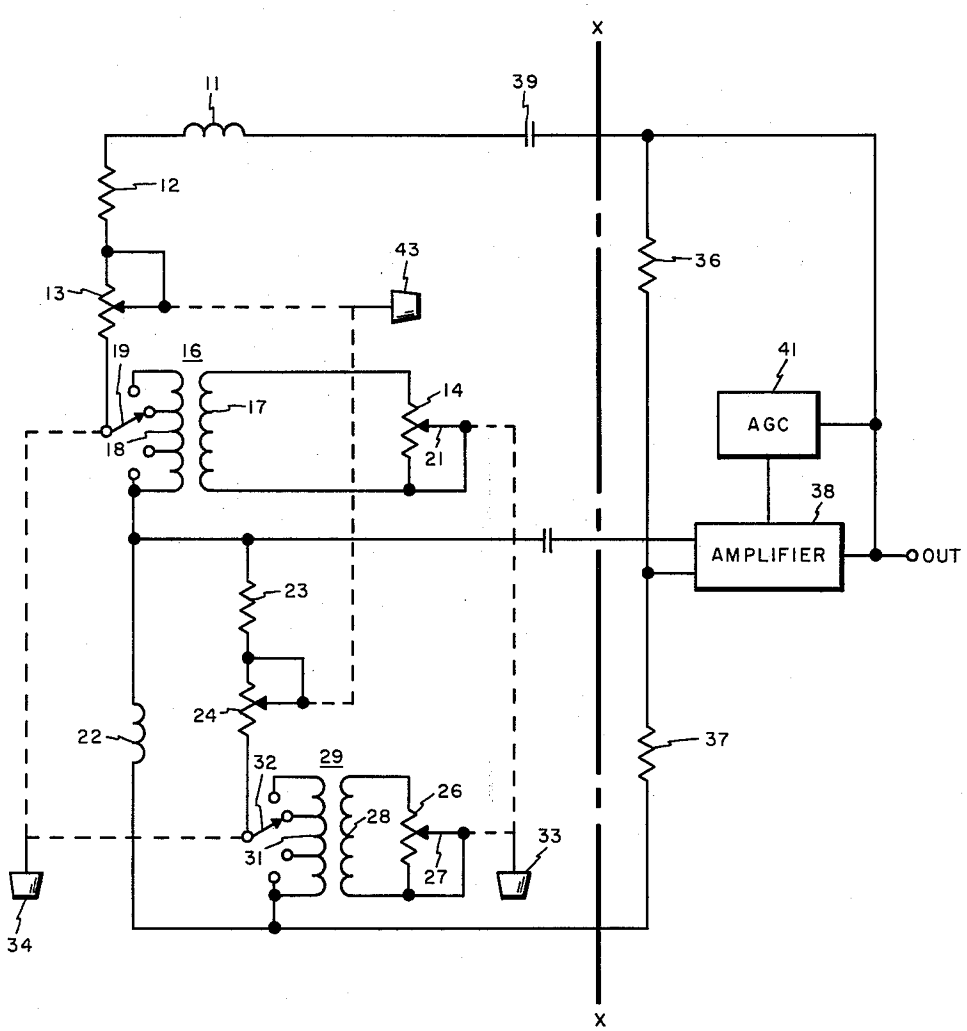
FIGURE 1 is a combined block and schematic diagram of a preferred form of the invention.

Considering now the circuit of FIG. 1. As is usual in inductance-resistance Wien bridge oscillators, one of the frequency controlling arms consists of an inductance and resistance connected in series while the other consists of an inductance and resistance connected in parallel. In such an arrangement the output frequency is determined by the expression:

$$F_0=\frac{\sqrt{R_1R_2}}{2\pi\sqrt{L_1L_2}} \qquad (1)$$

when $R_1$ is the resistance in the series connected arm, $R_2$ the resistance in parallel connected arm, $L_1$ the inductance in the series connected arm and $L_2$ the inductance in the parallel connected arm.

If, as is usually the case $R_1$ is made equal to $R_2$ and $L_1$ made equal to $L_2$, Expression 1 simplifies to $$F_0=\frac{R}{2\pi L} \qquad (2)$$

from which it can be seen that the output frequency varies linearly with change in resistance.

The series arm is composed of inductance 11, a small fixed resistance 12, a variable resistance 13, whose purpose will be explained later and main range varying resistance 14. The variable resistor 14 may be a 360° potentiometer and rather than being directly connected in the series arm has its resistance reflected therein through the transformer 16. To this end the potentiometer 14 is connected in shunt to the second 17 of the transformer 16 which has a tapped primary 18 so arranged that selected turns thereof may be inserted in series with the inductance 11 by movement of the movable contact 19. By this arrangement, at any selected setting of the slide 21 on the potentiometer 14, different amounts of resistance may be reflected into the series arm of the bridge by varying the turns ratio of the transformer 16 through actuation of contact 19.

Similarly the parellel arm is composed of inductance 22 having connected in shunt thereto the fixed resistor 23 and variable resistor 24. Potentiometer 26 having slider 27 is connected in shunt to the secondary 28 of transformer 29. The tapped primary 31 of this transformer has selected portions thereof connected in series with resistors 23 and 24 and hence in parallel with the inductance 22 by actuation of the movable contact 32. Thus as in the case with the series arm different amounts of resistance at any setting of the potentiometer 26 are reflectively connected in shunt with the inductance 22 through the turns ratio adjustment of the transformer 29 which adjustment is selected by actuation of the contact 32.

In order to have linear operation over the selected range, the inductance 11 has the same value as that of inductance 22. Likewise potentiometers 14 and 26 have identical values and they are simultaneously and equally varied through the medium of a common control knob 33. The turns ratios of the transformers 16 and 29 are also simultaneously varied by the common control knob 34.

The remaining arms of the bridge input are composed of resistors 36 and 37. The input bridge so constituted has its conjugate terminals connected to the input of the amplifier 38, the output of which is returned to the input of the bridge circuit through the coupling condenser 39.

Under the principle of unity gain the circuit operates so that the loop gain is always unity, that is the gain in the amplifier 38 is offset by the attenuation of the bridge circuit and the frequency of oscillations as given by the Expression 2 is the resonant frequency of resistance-inductance branch of the bridge. In order that stable conditions may be maintained under varying potential supplies, temperature conditions and the like, the amplifier gain is maintained constant by use of an automatic gain control circuit 41 connected between the output of the amplifier and an appropriate gain controlling terminal thereof.

As so far described, the simultaneous variations of the potentiometers 14 and 26, which may be of the 360° variety, will produce an output whose frequency is swept over a selected range. Because the amount of resistance reflected into the appropriate arm of the bridge depends on the turns ratio of the transformers 16 and 29, the particular range or band of frequencies so swept may be selected at will by simple simultaneous adjustment of the contacts 19 and 32.

The initial frequency at any setting of the common control 34 will depend on any fixed resistance inherent in the resistance-inductance arms as well as any which may be inserted to achieve proper operation. These fixed resistances are illustrated by fixed resistors 12 and 23.

In addition it may be desirable under certain conditions to select different initial starting points for any one swept range or band of frequencies. To this end variable resistor 13 is included in the series arm and a similar equal value variable resistor 24 is included in the parallel arm. These two resistors are simultaneously adjusted by the same amounts through the medium of a common control actuated by knob 43.

Figure 2:
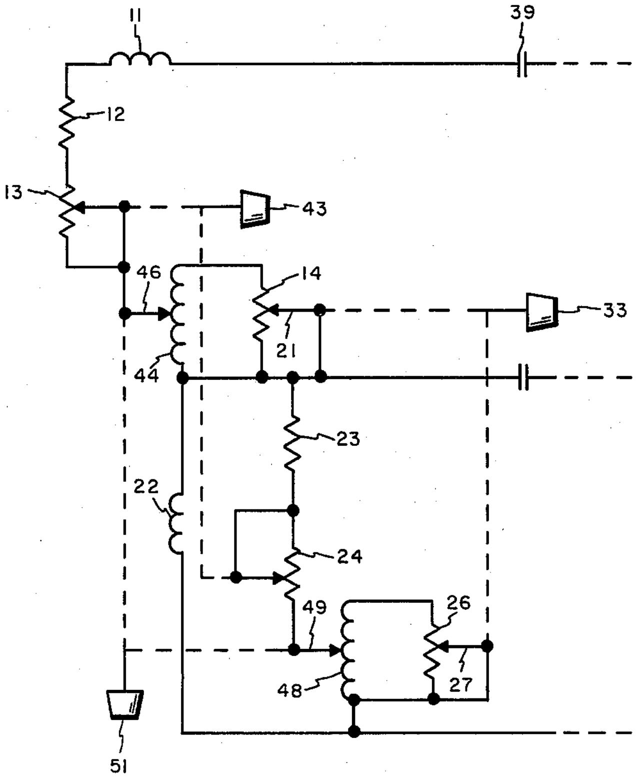
FIGURE 2 is a partial schematic diagram illustrating a modification of a portion of the circuit of FIG. 1.

In order to achieve the desired operation over various bandwidths by simple manual adjustment other arrangements for providing different turns ratios may be utilized. For example, the transformers may be continuously adjustable and autotransformers may be used. Such a modification is disclosed in FIG. 2 which constitutes a modification of that portion of the circuit of FIG. 1 which extends to the left of the dash-dot line *x*. In FIG. 2 those elements which are identical with the elements of the circuit of FIG. 1 are given like reference characters.

In this arrangement the resistance of the potentiometer 14 at whatever setting it may have is reflected through an autotransformer 44, the turns ratio of which is adjusted by varying contact 46. Similarly the resistance of potentiometer 26 is reflected into the parallel arm by an autotransformer 48 whose turns ratio is adjusted by appropriately positioning the contact 49. As in the case of the circuit of FIG. 1 the contacts 46 and 49 are made simultaneously adjustable by a common control actuated by the knob 51.

Other equivalent arrangements may be used such as sliding core transformers. Likewise the inventive concept may be applied to Wien bridge oscillators of the resistor-capacity type sacrificing linear variation of frequency as a function of resistance.

What is claimed is:

1. A bridge oscillator comprising, a first bridge arm including a first reactance element, a first potentiometer continuously variable over a range of resistance values, means for reflectively coupling the resistance adjustment of said first potentiometer in series with said first reactance element, a second bridge arm including a second reactance element, a second potentiometer continuously variable over a range of resistance values, means for reflectively coupling the resistance adjustment of said second potentiometer in parallel with said second reactance element, means for simultaneously adjusting said first and second potentiometers, means for simultaneously adjusting the magnitude of the coupling of said first potentiometer into said first bridge arm, and the magnitude of the coupling of said second potentiometer into said second bridge arm, third and fourth bridge arms each composed of resistance, said third and fourth arms being connected in series across said first and second bridge arms, an amplifier having its input connected to the junctions of said first and second and said third and fourth bridge arms, and means coupling the output of said amplifier to the input of the bridge formed by said four bridge arms.

2. A bridge oscillator as set forth in claim 1 in which the reactance of said first and second reactance elements is equal, said first and second potentiometer are substantially identical and are simultaneously adjusted to equal values, and the magnitude of coupling of said first potentiometer into said first bridge arm is at all times maintained equal to the magnitude of the coupling of said second potentiometer into said second bridge arm.

3. A bridge oscillator comprising, a first bridge arm including a first inductance, a first potentiometer continuously variable over a range of resistance values, means for reflectively coupling the resistance adjustment of said first potentiometer in series with said first inductance, a second bridge arm including a second inductance, a second potentiometer continuously variable over a range of resistance values, means for reflectively coupling the resistance adjustment of said second potentiometer in parallel with said second inductance,, means for simultaneously adjusting said first and second potentiometers by equal amounts, means for simultaneously varying the magnitude of the coupling of said first potentiometer into said first bridge arm, and the magnitude of the coupling of said second potentiometer into said second bridge arm, said coupling magnitudes being maintained equal at all times, third and fourth bridge arms each composed of resistance, said third and fourth arms being connected in series and across said first and second bridge arms, an amplifier having its input connected to junctions of said first and second and said third and fourth arms, and means coupling the output of said amplifier to the input of the bridge formed by said four bridge arms.

4. A bridge oscillator comprising, a first bridge arm including a first inductance, a first potentiometer continuously variable over a range of resistance values, a first transformer coupling the resistance of said first potentiometer in series with said first inductance, a second bridge arm including a second inductance equal in magnitude to said first inductance, a second potentiometer continuously variable over a range of resistance values, a second transformer coupling the resistance of said second potentiometer in parallel with said second inductance, means for simultaneously adjusting said first and second potentiometers by equal amounts, means for varying the coupling magnitudes of said first and second transformers simultaneously and by equal amounts, third and fourth bridge arms each composed of resistance, said third and fourth arms being connected in series and across a series circuit formed by said first and second arms, an amplifier having its input connected to conjugate junctions of said first and second, and said third and fourth arms, and means coupling the output of said amplifier to the input of the bridge formed by said four bridge arms.

5. A bridge oscillator as set forth in claim 4 having a first resistor connected in series with said first inductance, a second resistor equal in value to said first resistor connected in parallel with said second inductor, and means for varying the resistance of said first and second resistors simultaneously and by equal amounts.

6. A bridge oscillator comprising, a first bridge arm including a first inductance, a first transformer having its primary connected in series with said first inductance, a first potentiometer continuously variable over a range of resistance values connected across the secondary of said first transformer, a second bridge arm including a second inductance equal in magnitude to said first inductance, a second transformer having its primary connected in parallel with said second inductance, a second potentiometer, continuously variable over the same range of resistance values as said first potentiometer, connected across the secondary of said second transformer, means for simultaneously adjusting said first and second potentiometers by equal amounts, means for varying the turns ratios of said first and second transformers simultaneously and by equal amounts, third and fourth bridge arms each composed of resistance, said third and fourth arms being connected in series across a series circuit formed by said first and second arms, an amplifier having its input connected to conjugate junctions of said first and second, and said third and fourth arms, and means coupling the output of said amplifier to the input of the bridge formed by said four bridge arms.

7. A bridge oscillator as set forth in claim 6 having a first resistor connected in series with said first inductance and the primary of said first transformer, a second resistor equal in value to said first resistor connected in parallel with said second inductance and in series with the primary of said second transformer, and means for varying the resistance of said first and second resistors simultaneously and by equal amounts.

8. A bridge oscillator comprising, a first bridge arm including a first inductance, a first transformer having a tapped primary, said first inductor being connected in series with a selected portion of said primary through a contactor engaging the taps thereof, a first potentiometer continuously variable over a range of resistance values connected across the secondary of said first transformer, a second bridge arm including a second inductance equal in magnitude to said first inductance, a second transformer having a tapped primary, said second inductor being connected in parallel with a selected portion of said second transformer primary through a contactor engaging the taps thereof, a second potentiometer, continuously variable over the same range as said first potentiometer, connected across the secondary of said second transformer, means for simultaneously operating the contactors of said first and second transformers whereby the turns ratios of said first and second transformers are maintained equal to each other, third and fourth bridge arms each composed of resistance, said third and fourth arms being connected in series across a series circuit formed by said first and second arms, an amplifier having its input connected conjugate junctions of said first and second, and said third and fourth arms, and means coupling the output of said amplifier to the input of the bridge formed by said four bridge arms.

9. A bridge oscillator as set forth in claim 8 having a first resistor connected in series with said first inductance and a selected portion of the primary of said first transformer, a second resistor equal in value to said first resistor connected in parallel with said second inductance and in series with a selected portion of the primary of said second transformer, and means for varying the resistance of said first and second resistors simultaneously and by equal amounts.

No references cited.

ROY LAKE, *Primary Examiner.*